United States Patent [19]

Gualtieri et al.

[11] Patent Number: 5,694,205
[45] Date of Patent: Dec. 2, 1997

[54] BIREFRINGENT-BIASED SENSOR HAVING TEMPERATURE COMPENSATION

[75] Inventors: Devlin M. Gualtieri, Ledgewood; Janpu Hou; William R. Rapoport, both of Bridgewater; Herman Van de Vaart, Califon, all of N.J.

[73] Assignee: AlliedSignal Inc., Morris Township, N.J.

[21] Appl. No.: 545,455

[22] Filed: Oct. 19, 1995

[51] Int. Cl.$^6$ ........................................... G01L 1/24
[52] U.S. Cl. ........................... 356/33; 73/800; 356/365
[58] Field of Search ........................... 356/33, 365, 351, 356/364; 73/800

[56] References Cited

U.S. PATENT DOCUMENTS 4,321,831  3/1982  Tomlinson et al. ..................... 356/33
5,255,068  10/1993  Emo et al. .............................. 356/351
5,561,522  10/1996  Rapoport et al. ...................... 356/33

FOREIGN PATENT DOCUMENTS

A2 0 554 211   8/1993   European Pat. Off. .
A 94/02816     2/1994   European Pat. Off. .
A 285 418     12/1990   Germany .

Primary Examiner—Richard A. Rosenberger
Attorney, Agent, or Firm—Verne E. Kreger, Jr.

[57] ABSTRACT

A birefringent bias is provided to an optical sensor by the addition of one or more single birefringent elements where the total birefringence-length product remains within the accepted tolerances of current devices. The bias provided by two or more elements is such that where each element has a birefringence, a dB/dT and a coefficient of thermal expansion term, the elements are arranged in tandem so that the combined birefringence terms equal the required birefringence bias and the dB/dT and coefficient of thermal expansion terms effectively cancel.

8 Claims, 6 Drawing Sheets

BIREFRINGENT-BIASED SENSOR HAVING TEMPERATURE COMPENSATION

FIELD OF THE INVENTION

This invention relates to birefringent sensing means.

BACKGROUND OF THE INVENTION

It is desirable to have optical sensors to detect temperature, pressure, torque, position, etc. since optical sensors are immune to electrical interference. Wesson describes in U.S. Pat. No. 4,466,295 means for using the photoelastic effect to measure stress in plates that can be related to externally applied forces. The sensor disclosed in Wesson is not particularly effective because the output signal is light intensity dependent and is adversely sensitive to environmental effects to the overall sensor system. A further drawback is that the sensor output is linear over only a narrow pressure range. Therefore, one must calibrate multiple sensors over different pressure ranges.

Sensing devices utilizing birefringent crystals have been described for temperature by Emo et al. in U.S. Pat. No. 5,255,068 entitled "Fringe Pattern Analysis of a Birefringent Modified Spectrum to Determine Environmental Temperature" which is incorporated herein by reference. Emo et al. describe an optical high-temperature sensor based on a birefringent element made of a single crystal. A broad band light spectrum is transmitted through a first linear polarizer creating a linearly polarized wave. The linearly polarized wave passes through a single crystal birefringent plate at 45° to the optical axis of the crystal. The polarized wave can be represented by two equal linear polarized vectors which are aligned along the optical axes. Propagation of these waves through the birefringent plate introduces a temperature dependent phase shift between the two waves. Thereafter, a second linear polarizer combines the two waves creating a modulated spectrum. Information derived from this modulated spectrum, or fringe pattern, is then used to measure the temperature of the birefringent plate.

Generally, signal processing design parameters for birefringent sensors require a birefringent bias, that is, birefringence in the absence of sensing. In the case of a pressure sensor, the sensing material must not only have a capacity for stress-induced birefringence, but also, the material must be birefringent in the absence of stress. In birefringent sensors of the prior art, this is achieved by the use of sensor materials having intrinsic birefringence. Sapphire is an example of a crystal that exhibits this characteristic. A drawback, however, is that many materials with excellent stress-induced birefringence are excluded from use in such sensors if this detection scheme is employed. This typically results in increased material cost (e.g., a single crystal vs. glass) or increased engineering costs (e.g., making a small piece of crystal function in the place of a larger piece). The present invention decouples the birefringent biasing function from the sensing function to allow for the use of less expensive materials, such as isotropic materials, as the sensing medium. The invention also allows for temperature compensation of such sensors

SUMMARY OF THE INVENTION

Accordingly it is an object of the present invention to provide an optical sensor having a bias birefringence. The bias birefringence is provided by one or more single birefringent elements arranged so that the total birefringence length product remains within the accepted tolerances of current devices. In the preferred embodiment, the bias is provided by two or more elements where each element has a birefringence (B), a dB/dT and a coefficient of thermal expansion (CTE) term. The elements are arranged in such a configuration so that the combined birefringence terms equal the required birefringence and the combined dB/dT and CTE terms are minimized.

An optical pressure sensing apparatus comprises a broad band light source which is transmitted via a first fiber optic cable, a collimator and a first polarizer to the birefringent-biased sensor. The sensor transmits a wavelength/polarization component of the light. Light exits the sensor and is captured by a second polarizer whose axis is parallel or perpendicular to the first polarizer producing a wavelength modulated light spectrum. A focusing element collects the light and transmits it via a second fiber optic cable to an opto-electronic interface where an intensity vs. wavelength (fringe) pattern is extracted by a processing unit. The processing unit performs a Fourier transform on the fringe pattern, and the phase term of the selected frequency relates to the environmental pressure of the sensor compensated for temperature effects.

DETAILED DESCRIPTION OF THE PREFERRED EMBODIMENTS OF THE INVENTION

The preferred embodiments of this invention will be better understood by those skilled in the art by reference to the above Figures. The preferred embodiments of this invention illustrated in the Figures are neither intended to be exhaustive nor to limit the invention to the precise form disclosed. The Figures are chosen to describe or to best explain the principles of the invention, and its application and practical use to thereby enable others skilled in the art to best utilize the invention.

The present invention provides zero sensing birefringence bias through the addition of a bias birefringent material in the optical path of the sensing element. The invention is applicable for use in a pressure detector system as disclosed in U.S. Pat. Nos. 5,589,931 and 5,561,522, both assigned to the same assignee as the present application and incorporated herein by reference. The present invention is also useful in other birefringent sensing methods as is commonly known to those skilled in the art.

Generally, crystals are anisotropic with respect to their physical properties. That is, their property values vary with the direction in the crystal. Anisotropy of the refractive index is called birefringence and is defined as $n_e - n_o$, where $n_e$ is the extra ordinary index of refraction and $n_o$ is the ordinary index of refraction. Uniaxial crystals can be categorized as positive or negative depending on whether the $n_e$ term is larger or smaller than $n_o$. Exemplary uniaxial crystals are sapphire, magnesium fluoride and crystalline quartz. The terms $n_e$ and $n_o$ are not used for biaxial crystals that have 3 separate refractive indices. Examples of biaxial crystals are c-centered monoclinic crystals defined as space group $C^6_{2h}$-C2/c and are exemplified by Lanthanum Beryllate or Beryllium Lanthanate ($La_2Be_2O_5$ or "BeL") as referenced by H. Harris and H. L. Yakel, Acta Cryst., B24, 672–682 (1968). Other biaxial crystals include alexandrite and yittrium aluminum pervoskite ("YAP"). For biaxial crystals, terms such as $n_a$, $n_b$, and $n_c$ can be used, or any two such terms and their respective temperature dependent birefringent terms can be substituted giving a total of 3 separate cases for this class of crystals.

Figure 1:
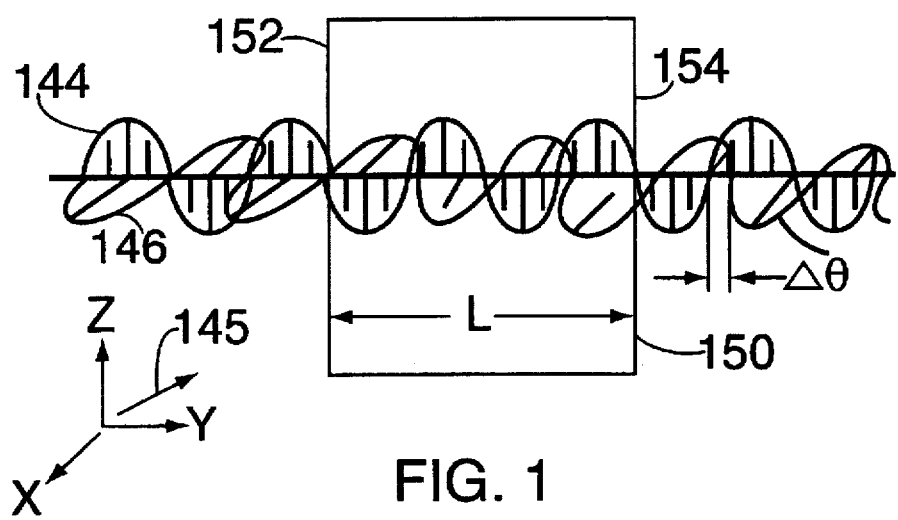
FIG. 1 is a schematic exemplifying the concept of birefringence of a linearly polarized wave.

FIG. 1 illustrates the principles of birefringence. Two orthogonally polarized waves 144 and 146 enter and propagate through a birefringent element 150. The electric polarization vectors of these two waves are oriented in the X and Z directions, and the waves propagate in the Y direction. On entering face 152, the linearly polarized wave propagates through element 150 at different velocities due to different refractive indices in the x and z planes. Therefore, waves 144 and 146, which exhibited a zero phase difference before entering element 150, now exhibit a certain phase difference $\Delta\theta$ on exiting face 154. The phase difference depends on the difference in the indices of refraction, the path length, L, through the birefringent element 150, the temperature of crystal 150 and the wavelength of the broad band light source.

Figure 2D:
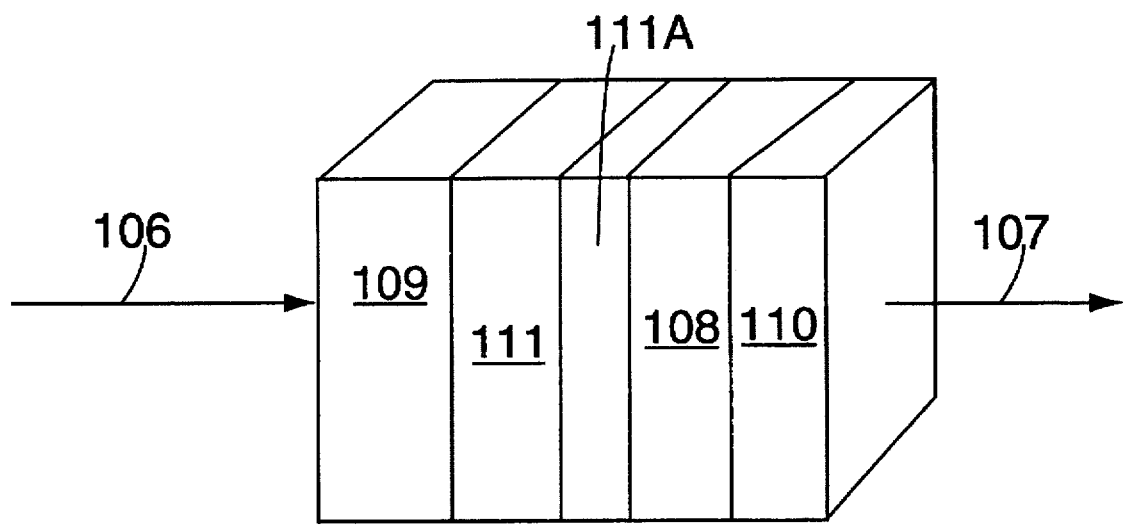
FIG. 2d is a block diagram representing the preferred embodiment of a photoelastic sensor of the present invention.
Figure 2A:
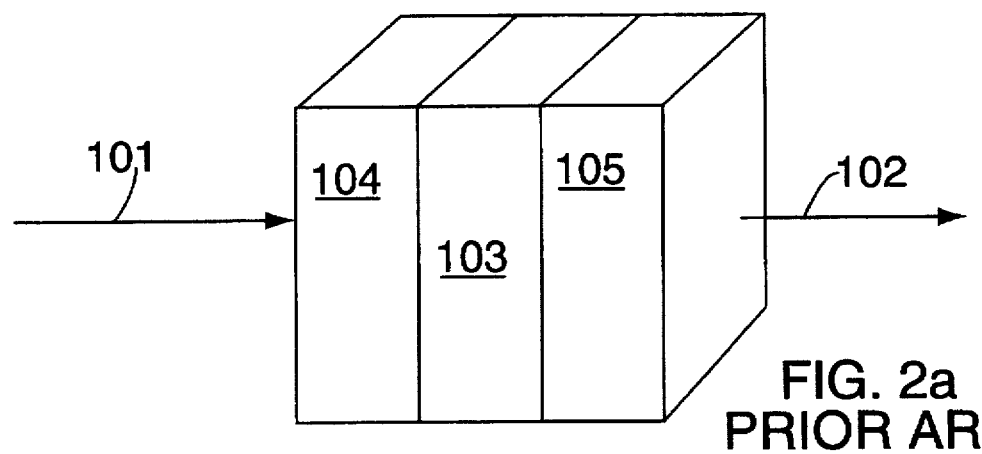
FIG. 2a is a block diagram representing a photoelastic sensor of the prior art.

Utilizing the principles of birefringence, FIG. 2a illustrates the principle as disclosed in the Wesson prior art reference. Light signal 101 enters the sensor and is detected after passage through the sensor at 102. The element 103 which features stress induced birefringence is placed between a polarizing filter 104 arranged at a forty-five degree angle to the optical axis of 103 in either a clockwise or counter-clockwise sense and an analyzing filter 105 also arranged at forty-five degrees to the optical axis of 103, but in the opposite rotational sense as 104. As earlier indicated, this principle limits the types of sensing materials and increases the cost of any overall sensing system.

Figure 2B:
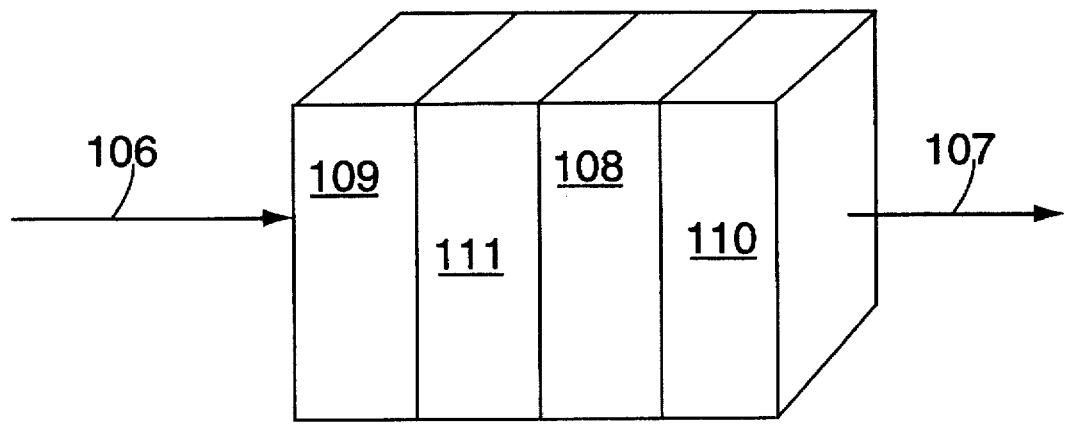
FIG. 2b is a block diagram representing one embodiment of a photoelastic sensor of the present invention.

FIG. 2b shows the optical path of the sensor of one embodiment of the present invention. Light signal 106 enters the sensor and is detected after passage through the sensor at 107. The stress sensitive birefringent element 108 is placed between a polarizing filter 109 and an analyzing filter 110. The polarizing filter 109 is arranged at a forty-five degree angle to the optical axis of 108 in either a clockwise or counter-clockwise sense. The analyzing filter 110 is also arranged at forty-five degrees to the optical axis of 108, either in the opposite rotational sense as 109 or parallel to 109. Intervening in the optical path is a birefringent material 111 whose optical axis and thickness is arranged to give a desired biasing birefringence. Therefore, element 108 is no longer required to be a birefringent media, but is only required to possess stress-induced birefringence.

Figure 3:
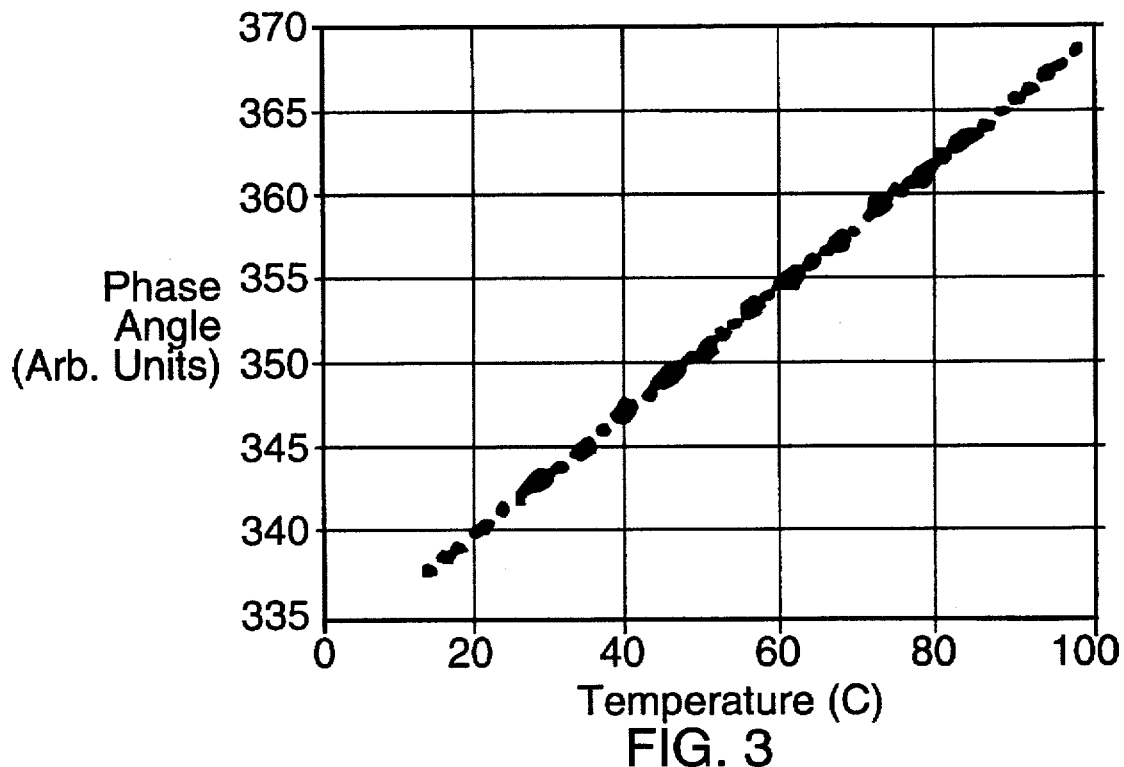
FIG. 3 is a graphical representation of the temperature dependence of a typical vanadate bias crystal at 0.371 deg. phase/deg. C°.

One advantage of the present invention is that the environmental properties of the biasing element 111 can be chosen to be different from those of the previously solitary sensing element 108. Therefore, the sensor can be compensated for undesired responses to changes in environment, for example, temperature. FIG. 3 illustrates the effects temperature has on a bias element 111.

Figure 2C:
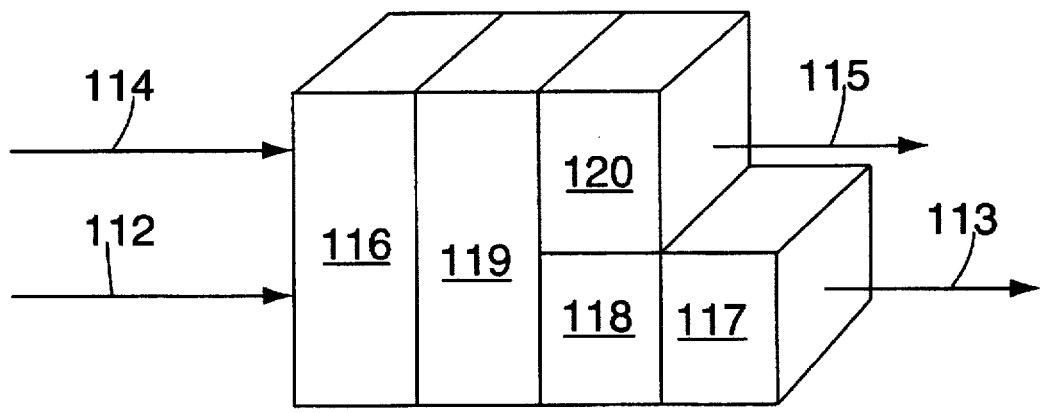
FIG. 2c is a block diagram representing an alternate embodiment of a photoelastic sensor of the present invention.

FIG. 2c illustrates one embodiment for compensating for undesired responses to changes in the environment. A sensor comprises a dual optical path to allow separate monitoring of the bias material. Light signal 112 enters the sensor and is detected alter passage through the sensor at 113. The stress sensitive birefringent element 118 is placed between a polarizing filter 116 and an analyzing filter 117. The polarizing filter 116 is arranged at a forty-five degree angle to the optical axis of 118 in either a clockwise or counter-clockwise sense. The analyzing filter 117 arranged also at forty-five degrees to the optical axis of 118, either in the opposite rotational sense as 116 or parallel to 116. Intervening in the optical, path is a birefringent material 119 whose optical axis and thickness are arranged to give a desired biasing birefringence. A further optical path is provided with a light signal 114 passing through only the polarizer 116, the bias material 119, an analyzer filter 120, and finally exiting at 115. The polarizing filter 116 and analyzing filter 120 have the same orientation to the optical axis of the bias material 119 as the polarizing filter 116 and analyzing filter 117 have to the sensing material 118. Signal 115 comprises an external environment effects component, such as temperature. Signal 113 comprises the components of signal 115 and in addition the stress-induced birefringent signal component of element 118. The result of subtracting signal 115 from signal 113 is the stress-induced signal compensated for environmental effects.

FIG. 2d illustrates the preferred embodiment of the invention which comprises a thermally compensated design where the birefringent bias is done by two crystals 111 and 111A in tandem. The bias crystal are configured so that the respective dB/dT terms effectively cancel, but the respective B terms give the approximate required birefringence bias. The birefringence bias is such that $$ABS[L_1B_1 \pm L_2B_2]=40\lambda, \qquad [1]$$

where 40 is roughly the number of orders of the effective waveplate, where $L_1$ and $L_2$ are the respective crystal lengths, $\lambda$ is the central wavelength of the light source, and $B_1$ and $B_2$ are the respective birefringences. ABS refers to the absolute value of the enclosed terms. The interior sign can be + or − dependent on how the crystals are arranged. For example, if identical birefringent elements are arranged with parallel-like axes, the birefringence-length product would be 2×1×B where 1 is the length of one of the elements. If one of those crystals was rotated 90°, the terms would cancel and no birefringence would be measured.

In accordance with the preferred embodiment of the invention, for the thermal terms of the bias crystals to compensate:

$$L_1*(\alpha Bo_1 dB_1/dT)+L_2*(\alpha Bo_2+dB_2/dT)=0 \qquad [2]$$

where $L_1$ and $L_2$ are the respective crystal lengths, $\alpha$ is the coefficient of thermal expansion, $Bo_1$ and $Bo_2$ are the birefringence of each element and $dBt_1/dT$ and $dB_2/dT$ are the birefringence change as a function of temperature for the respective crystals. $dB_1/dT$ and $dB_2/dT$ are defined as $dn_o/dT-dn_e/dT$ for consistency of the respective materials. If $dB/dT$ terms are opposite in sign, then the extra-ordinary axes are parallel, if they are the same sign, rotating one crystal 90° will cause the terms to cancel. In the parallel case the B terms will add; in the crossed (90°) case they will subtract. The signs of the terms are important and attention must be paid for consistency. Equations [1] and [2] can be solved for $L_1$ and $L_2$ for two given materials.

Figure 4:
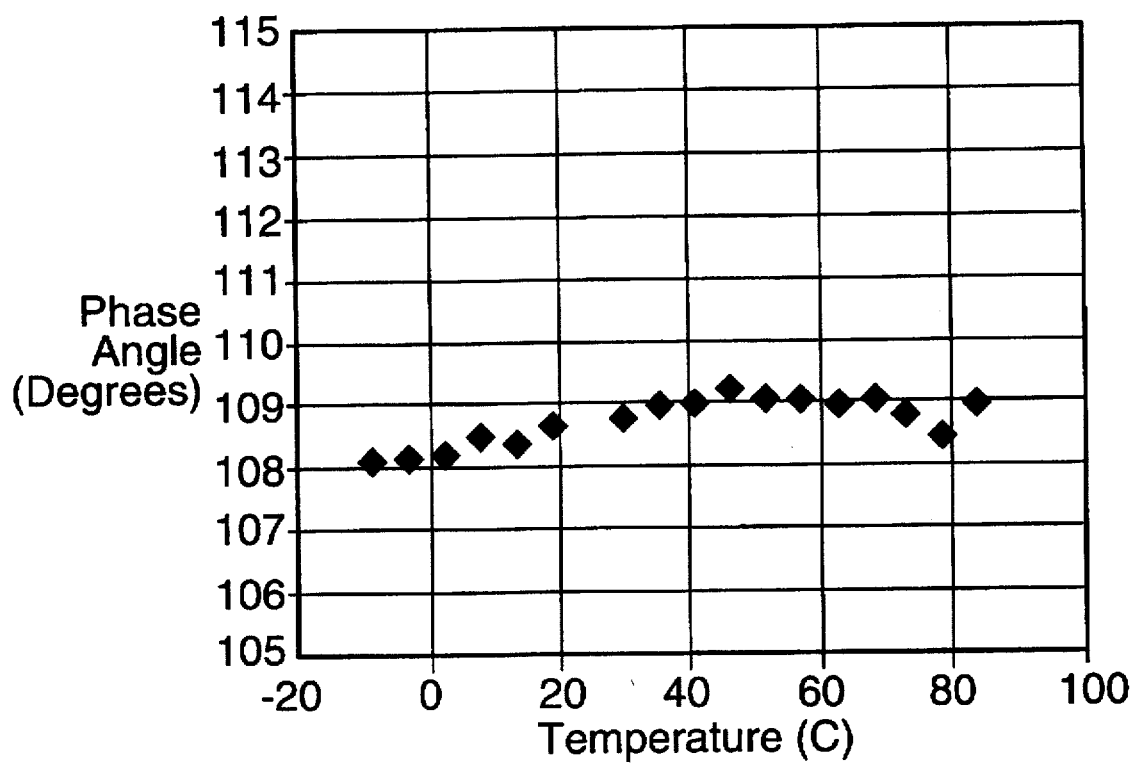
FIG. 4 is a graphical representation of a temperature compensated vanadate and quartz crystal bias elements in tandem at 0.0089 deg. phase/deg. C°.

FIG. 4 illustrates a vanadate and quartz crystal that provide birefringence bias, compensated for temperature. The temperature sensitivity is only 0.0089 deg. phase/deg. C.°, much less than that shown in FIG. 3.

Optimally, the best optical sensors occur when the elements materials are mechanically stable and stable to high temperatures, have well known optical and mechanical properties and have good thermal conductivity, and low $dB/dT$ terms. The lower $dB/of$ the less temperature sensitivity the system will have. Examples of material combinations and thickness are:

| Material 1 | Material 2 | orientation | thickness $L_1$ (mm) | thickness $L_2$ (mm) |
|---|---|---|---|---|
| YALO | YLF | 90° | 0.3587 | 0.7439 |
| YLF | MgF$_2$ | 0° | 0.849 | 1.302 |
| YLF | quartz | 0° | 0.8006 | 1.8413 |
| YVO$_4$ | YALO | 90° | 0.213 | 0.627 |
| YVO$_4$ | YLF | 90° | 0.213 | 0.627 |
| BeL | LiSAF | 90° | 0.559 | 3.345 |
| BeL | YALO | 90° | 1.59 | 3.00 |
| YVO$_4$ | quartz | 90° | 0.196 | 0.984 |

This invention is not limited in scope to the materials mentioned above but may include a wide variety of naturally birefringent media used in various combinations that involve more than two materials.

Figure 5:
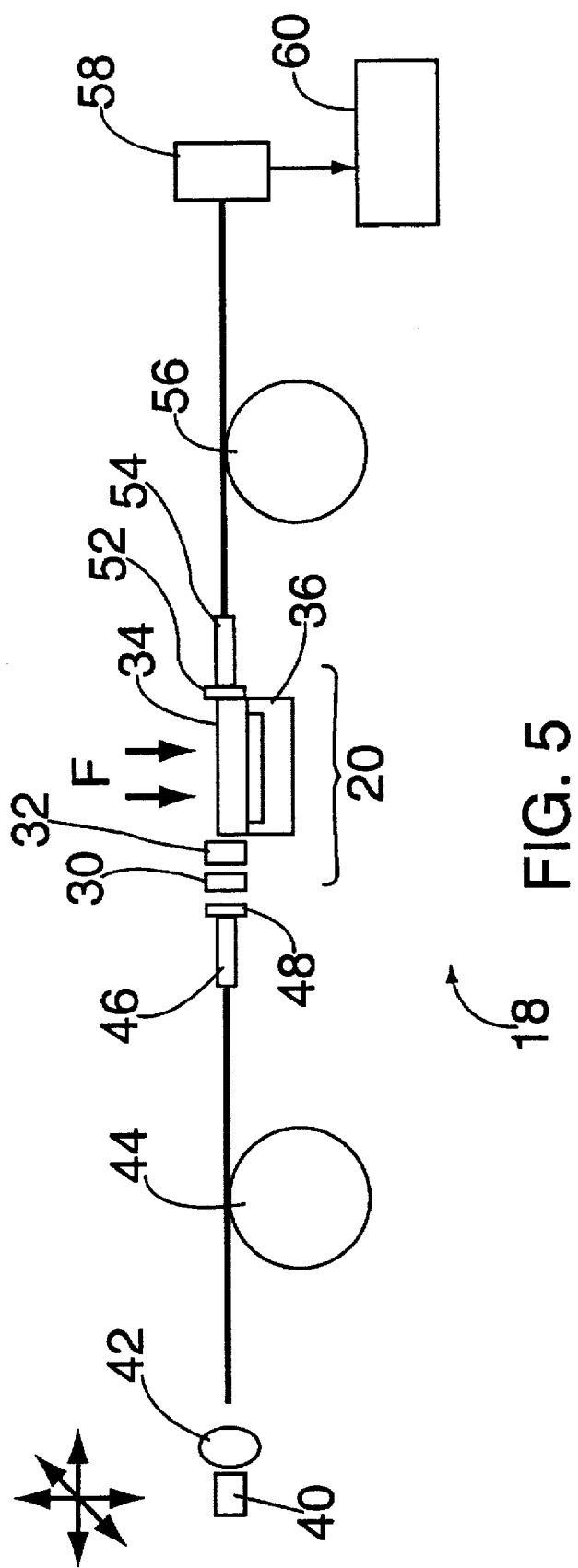
FIG. 5 is a block diagram of a pressure sensing system.
Figure 6:
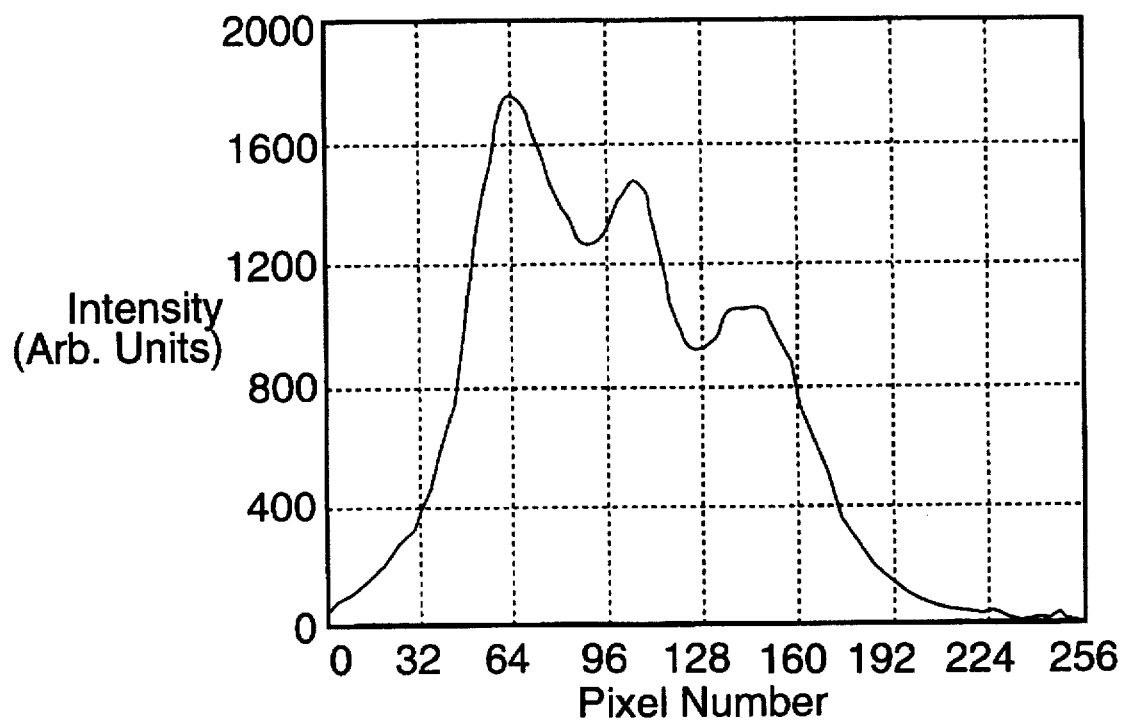
FIG. 6 is the amplitude/frequency waveform of a broad band light source useful in the practice of the invention.

FIG. 5 illustrates a pressure sensing system 18 utilizing a pressure sensor 20 comprising two bias birefringent crystal elements arranged in tandem and in further combination with a pressure sensing plate 34. In this embodiment, sensor 20 comprises of two birefringent biasing elements 30 and 32, however, any practical number of birefringent elements may be employed. System 18 utilizes a broad band light source 40 as may be generated by a plurality of LEDs having an exemplary waveform illustrated in FIG. 6. The broad band light source 40 is randomly polarized and is focused by lens 42 into a multi-mode optical fiber 44. The light output of fiber 44 is collimated by lens 46, such as a gradient index lens, and is directed through a polarizer 48 that passes only linear polarized light preferably with a >100:1 extinction ratio to provide an acceptable signal-to-noise ratio. However, an extinction ration of 2:1 would still provide an acceptable signal for this invention.

Polarizer 48 is aligned so that it transmits the linearly polarized light at 45° to the optical axis of the birefringent crystal elements 30 and 32. The crystals are further arranged so that the ct. Bo and $dB/dT$ terms cancel so that no significant temperature effects contribute to the signal modification. The polarized light is decomposed into two orthogonal polarization states by the tandem birefringent crystal elements 30 and 32. The two orthogonal polarized light waves experience a temperature compensated phase shift propagating through crystals 30 and 32.

The birefringently-biased light then passes through pressure sensing plate 34, which is an isotropic media such as fused silica, YAG or glass. Sensor 34 is typically a disk with two opposing flats cut on the disk and polished to pass light and two major faces, which on one, a force F is exerted. Sensor 34 is supported by a fixture 36. The areas of maximum stress occur near the surfaces of the major faces so the light output of elements 30 and 32 pass near the surfaces of the major faces.

Figure 8:
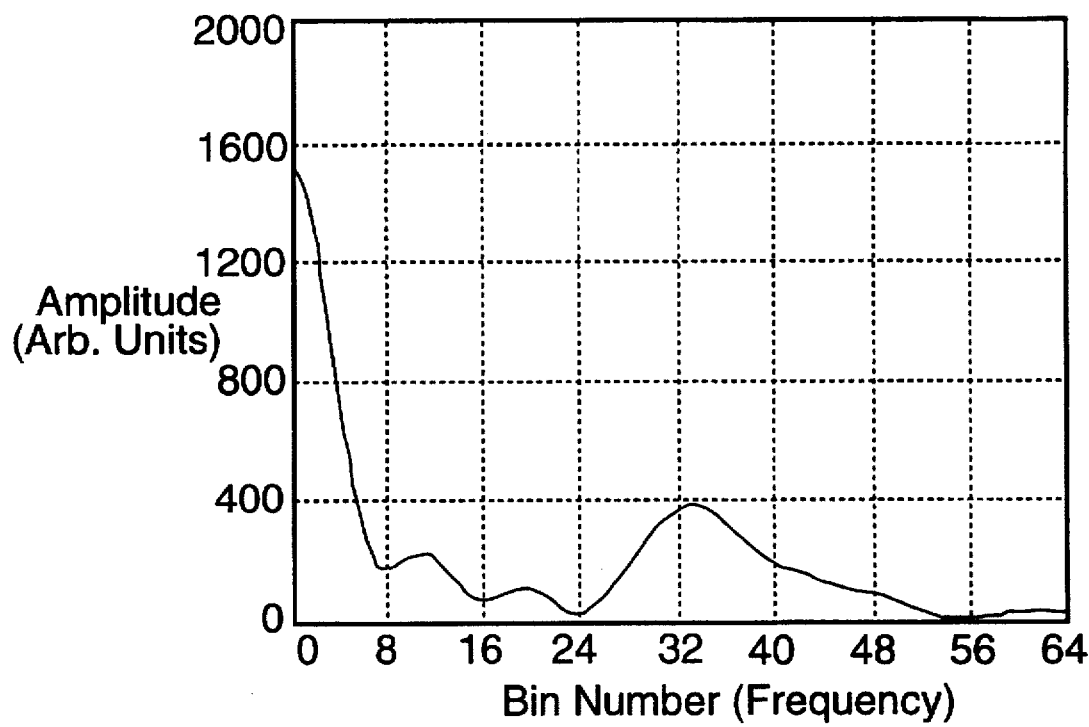
FIG. 8 is a Fourier transform of the waveform of FIG. 7.
Figure 9:
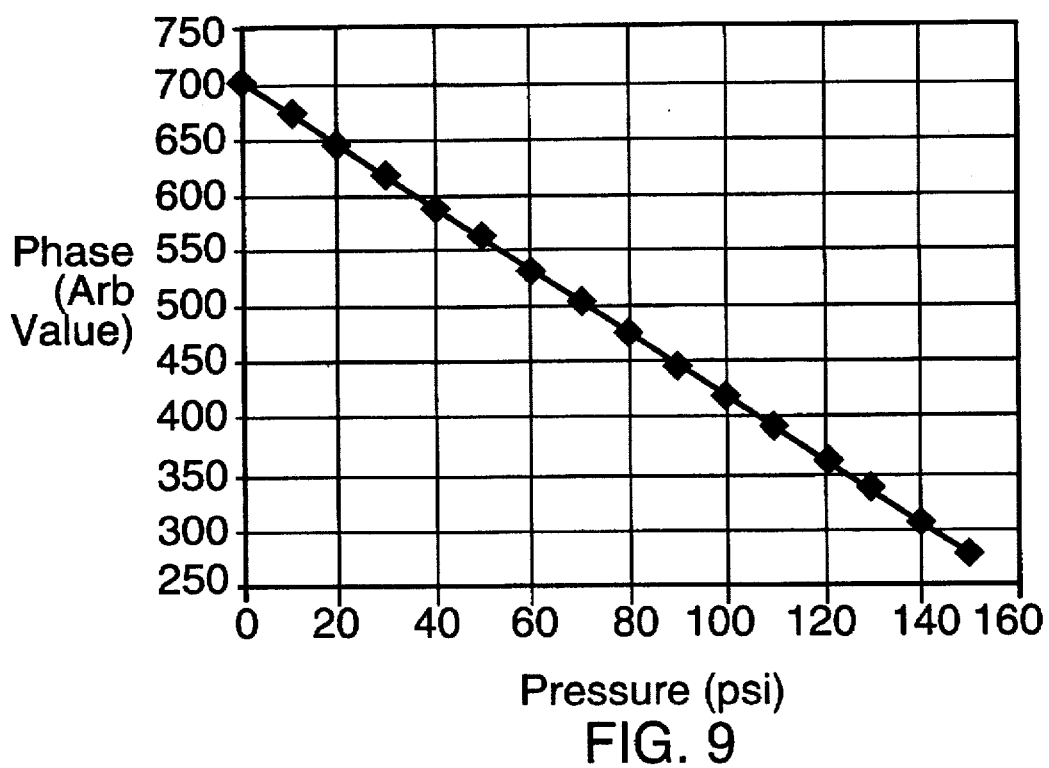
FIG. 9 is a graphical representation of phase vs. pressure for an optical pressure system in accordance with the invention.
Figure 7:
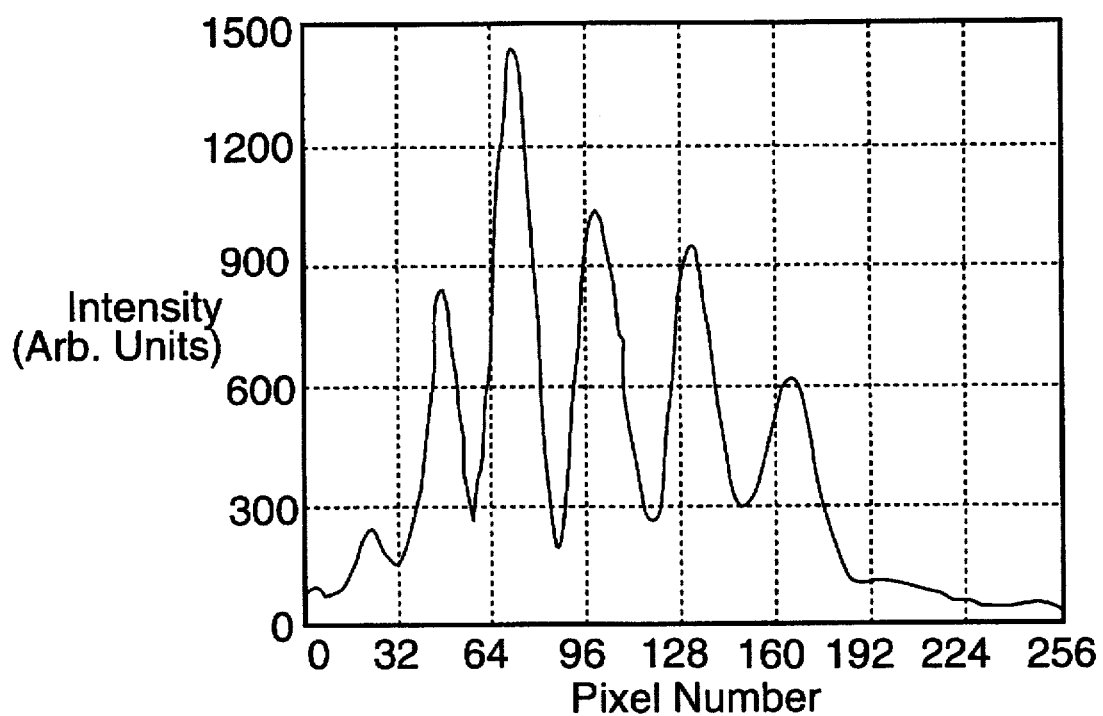
FIG. 7 is an intensity vs. wavelength waveform of a modulated light spectrum generated by an opto-electronic interface.

The output of crystal 34 is collected by a second polarizer 52, commonly known as an analyzer, having the same or a 90° orientation to polarizer 48. Polarizer 52 combines the two orthogonal phases to form a modulated light spectrum. The light spectrum is focused down a second fiber optic cable 56 by a second collimating means 54. The output of the fiber optic cable is directed to an opto-electronic interface 58, such as a spectrometer having a fiber optic input and a charge coupled device (CCD) array output. The light spectrum is focused onto an array of photodetectors or a CCD detector associated with conditioning electronics which yields the intensity vs. time (intensity vs. wavelength) fringe pattern signal as shown in FIG. 7. The opto-electronic interface 58 has a 256 element CCD array as the detection system. Dispersion elements inside the unit have pixel number 1 at 748 nm and pixel number 256 at 960 nm. The entire LED spectrum is therefore observed on the CCD array yielding intensity versus wavelength information. In the preferred case there will be six to ten fringes produced on this CCD array due to the action of the two polarizers and the tandem crystals located between them. Six to ten fringes have been determined to give the required system accuracy and low production costs of the hardware involved. This number of fringes determines the amount of total birefringence-length product that the crystals must provide. A CPU 60 digitizes the signal and performs a Fourier transform on the signal, which resultant is shown in FIG. 8. The measured phase shift of the transformed signal is a direct representation of the pressure exerted on crystal 34. The largest amplitude signal peaked at frequency zero (arb. units) is due to dc terms. The small amplitude feature peaked at frequency 22 (arb. units) is due to the wavelength spacing of the three LEDs that comprise the light source 40. The larger amplitude signal peaked at frequency 33 (arb. units ) is due to the birefringent length product. The phase information at this frequency is related to environmental pressure sensed by sensor 20. FIG. 9 graphically illustrates the linear relationship between the phase information and sensed environmental pressure.

This light source, birefringent, and detection system form a self-consistent arrangement that is capable of the required accuracy. There are many other combinations that can achieve the same results. For example; The LED light source can be located at another wavelength and have a width that is considerably narrower than that used in the previous example. This would require a detection system that operates at a different wavelength and has a higher resolution requirement so as to spread out the wavelengths over the same number of pixels. To achieve the same number of fringes, the birefringent will have to be increased which can be accomplished by changing the birefringent crystal and/or changing its propagation length.

We claim:

1. A photoelastic sensor comprising a sensing element that exhibits birefringence in the presence of external pressure applied to said sensing element in combination with a first and second biasing element that exhibit birefringence in the absence of said external pressure applied to said biasing element and said biasing elements further selected and aligned with respect to each other so that the sum of the dB/dT terms of said first and second biasing elements are substantially zero where B is the birefringence terms of said first and second biasing elements and T is the temperature experienced by said first and second biasing elements.

2. The photoelastic sensor of claim 1 wherein the birefringence of said first and second biasing elements is such that $$ABS[L_1 B_1 \pm L_2 B_2] = X\lambda$$

and said sensor is temperature compensated such that:

$$L_1(dB_1/dT_1) + L_2(dB_2/dT_2) \text{ substantially equal } 0$$

where $L_1$ and $L_2$ are the respective lengths of said biasing elements, X is the approximate value of orders of the effective waveplate, $\lambda$ is the central wavelength of the light source and $dB_1/dT_1$ and $dB_2/dT_2$ are the birefringence change as a function of temperature for the respective biasing elements.

3. The photoelastic sensor of claim 2 wherein said sensor is temperature compensated such that:

$$L_1 \cdot (dB_1/dT_1 + \alpha_1 \cdot B_1) + L_2 \cdot (dB_2/dT_2 + \alpha_2 \cdot B_2) \text{ substantially equal } 0$$

where $\alpha$ is the coefficient of thermal expansion of each respective birefringent crystal.

4. The photoelastic sensor of claim 3 wherein said sensor further comprises a plurality of n birefringent crystals in tandem wherein the birefringence of said sensor is such that $$ABS \cdot [L_1 \cdot B_1 \pm L_2 \cdot B_2 \pm \ldots L_n \cdot B_n] = X \cdot \lambda$$

and said sensor is temperature compensated such that:

$$L_1 \cdot (dB_1/dT_1 + \alpha_1 \cdot B_1) \pm L_2 \cdot (dB_2/dT_2 + \alpha_2 \cdot B_2) \pm \ldots L_n \cdot (dB_n/dT_n + \alpha_n \cdot B_n)$$

substantially equal zero.

5. The photoelastic pressure sensor of claim 1 wherein said first and second biasing elements are selected from the group consisting of YALO, YLF, $MgF_2$, quartz, $YVO_4$, BeL and LiSAF.

6. A pressure sensor system for providing a frequency signal indicative of an environmental pressure comprising a sensor for receiving a linearly polarized light source and further comprising a sensing element that exhibits birefringence in the presence of said external pressure applied to said sensing element in combination with a first and second biasing element that exhibit birefringence in the absence of said external pressure and said biasing elements further selected and aligned with respect to each other so that the sum of the dB/dT terms of said first and second biasing elements are substantially zero where B is the birefringence terms of said first and second biasing elements and T is the external temperature experienced by said first and second biasing elements;

whereby said linearly polarized wave decomposes into first and second orthogonally polarized waves, and an application of force to said sensing element causes a stress-induced birefringence resulting in said first and second orthogonally polarized waves to experience a further phase difference on propagating through said sensing element proportional to said force.

7. The pressure sensor system of claim 6 further comprising:

a polarizer for combining said first and second orthogonally polarized waves to create a modulated light spectrum having a fringe pattern, said fringe pattern being a function of said environmental pressure;

an opto-electronic interface for accepting said modulated light spectrum output from said polarizer and producing a corresponding electrical signal; and computing means for conditioning said electrical signal to extract a waveform at a specified frequency to determine said environmental pressure.

8. The pressure sensor system of claim 6 wherein said first and second biasing elements are aligned with respect to each other so that the respective coefficient of thermal expansion terms of said first and second biasing elements effectively cancel.

* * * * *